D. C. WINANS.
MANUFACTURE OF SPECTACLE TEMPLES AND JOINTS.
No. 190,659. Patented May 8, 1877.
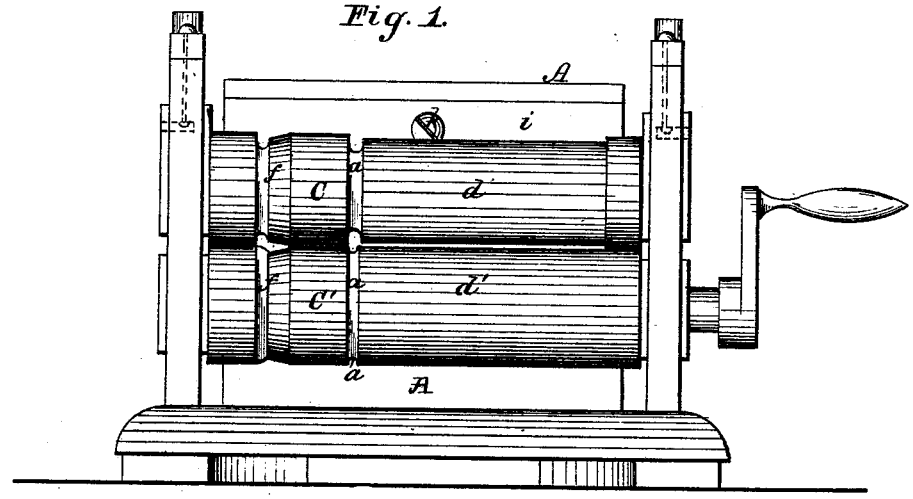
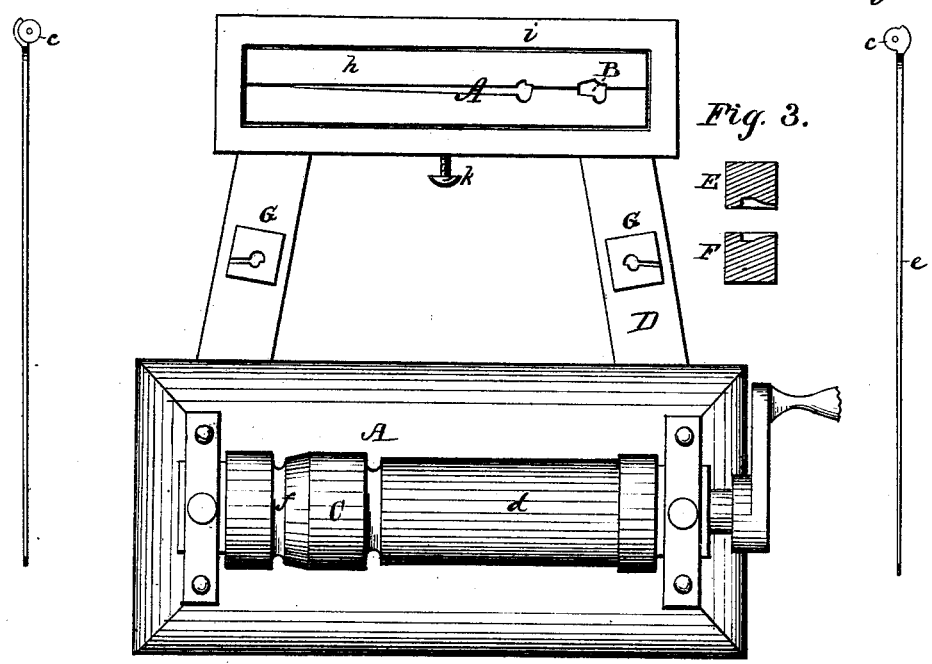
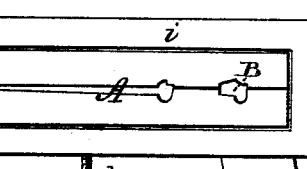
Witnesses: Inventor:
D. C. Winans

UNITED STATES PATENT OFFICE.

DORMER C. WINANS, OF NEW HAVEN, CONNECTICUT.

IMPROVEMENT IN THE MANUFACTURE OF SPECTACLE TEMPLES AND JOINTS.

Specification forming part of Letters Patent No. 190,659, dated May 8, 1877; application filed January 4, 1877.

*To all whom it may concern:*

Be it known that I, D. C. WINANS, of the city and county of New Haven, and State of Connecticut, have invented a new and useful Improvement in the Manufacture of Spectacle Temples and Joints; and I do hereby declare that the following is a full, clear, and exact description of the same, reference being had to the accompanying drawing, forming part of this specification, in which—

Figure 1 is a side elevation of the rolls and mold I employ for producing my improved temple and joint-piece. Fig. 2 is a plan view of the said rolls and the ingot-mold. Fig. 3 is a vertical section. Fig. 4 is an edge view of a temple and a joint-piece soldered thereto according to the old method. Fig. 5 is an edge view of a temple and joint-piece formed in one piece, according to my invention. Fig. 6 represents an end piece for spectacle-bows.

According to the method heretofore practiced, the temples and joint-pieces of spectacles have been constructed from separate pieces of metal, and soldered together, as shown in Fig. 4.

My method has for its object to cheapen and improve the construction of temples and joint-pieces by forming them solid together, or in one piece, as I will proceed to describe.

The preparatory step is to cast in mold A an ingot or blank, which has in cross-section approximately the shape of the complete or finished temple. It is, however, much thicker, and of such length that a number of temples may be cut or struck out of it. It has also a rib along one edge, and diminishes thence in thickness to the opposite side or edge.

The ingot is passed between the rolls C C', and the operation is repeated until it has been reduced to the desired thickness—that is to say, to the thickness of ordinary temples. To adapt the rolls for this work, they are each provided with a circumferential groove, $a$, one opposite the other, and having a suitable shape to form the joint-piece $c$, Fig. 5. The rolls have plain surfaces $d\ d'$, and the upper one is cut away or reduced, so that the surfaces $d\ d'$ are separated to the extent of the thickness of the tapered body of the ingot or temple blank. The ingot retains substantially the same form after rolling as before, namely, that of a rectangular plate having a thick rib along one edge.

The next step after rolling is cutting or punching out the temples and joint-pieces from the rolled and reduced ingot. Each temple $e$ and joint-piece $c$ are in one piece, as shown in Fig. 5. The number that can be cut or punched out obviously depends upon the length of the ingot, and that in turn depends partly upon the width of the mold-cavity A, for the greater the width the thicker the ingot cast, and the greater will be its length when reduced to sheet form in the rolls, and consequently the greater the number of temples which can be cut from it.

The third step consists in perfecting the shape of the joint or knuckles $c$ in the small pressing-dies E F G, and the fourth and last step is to drill and finish the joint-piece $c$ in the usual way.

The chief advantages of my method are that I avoid the labor and expense of casting and rolling the temples and joint-pieces separate and soldering them together, and avoid also annealing the joint end of the temple, and thereby depriving it of the desired elasticity, as is always done by the old method when the temple is heated red hot.

In brief, I produce a superior article and at reduced cost.

In practice, I pursue substantially the same method in constructing the end pieces of the bows of spectacles—namely, I cast a blank or ingot in the vertical cavity or mold B, reduce and shape it in the grooved portion $f$ of the rolls C C', and then cut the rolled, reduced, and perfected bar into pieces $g$, corresponding to that shown in Fig. 6, and which, when drilled and finished, form the end portions of the spectacle bows.

The side $h$ of the mold is made removable, to facilitate removal of the ingot cast therein.

The means of securing the parts together is a detachable band, $i$, having an adjusting screw.

What I claim is—

For the manufacture of the temples and joint-pieces of spectacles, the rolls having the circumferential grooves $a\ a$, and the plain separated surfaces $d\ d'$, as shown and described.

D. C. WINANS.

Witnesses:
 THEO. K. HAND,
 J. A. MALCOLM.